United States Patent [19]

Ohno et al.

[11] 3,927,205

[45] Dec. 16, 1975

[54] AQUEOUS SUSPENSION OF PHARMACEUTICALS

[75] Inventors: Yoshitomo Ohno, Nara; Yasuko Takigawa; Katsuo Aoki, both of Osaka; Takatsuka Yashiki, Hyogo, all of Japan

[73] Assignee: Takeda Chemical Industries, Ltd., Osaka, Japan

[22] Filed: Apr. 9, 1974

[21] Appl. No.: 459,359

[30] Foreign Application Priority Data

Apr. 9, 1973  Japan.................................. 48-40264

[52] U.S. Cl. ............... 424/80; 424/78; 424/362; 424/361; 424/363
[51] Int. Cl.$^2$ ................. A61K 31/79; A61K 47/00
[58] Field of Search .............................. 424/80, 362

[56] References Cited
UNITED STATES PATENTS

| | | | |
|---|---|---|---|
| 2,701,782 | 2/1955 | Culter................................... | 424/362 |
| 2,725,336 | 11/1955 | Sumner et al....................... | 424/362 |
| 3,312,594 | 4/1967 | Cyr et al............................. | 424/362 |
| 3,351,527 | 11/1967 | Apat et al........................... | 424/362 |
| 3,636,200 | 1/1972 | Zentner............................... | 424/362 |
| 3,639,637 | 2/1972 | Campbell............................ | 424/362 |

FOREIGN PATENTS OR APPLICATIONS

| | | | |
|---|---|---|---|
| 45-5275 | 2/1970 | Japan.................................. | 424/362 |
| 1,601,446 | 10/1970 | France................................ | 424/362 |
| 581,554 | 8/1959 | Canada................................ | 424/80 |

*Primary Examiner*—Donald B. Moyer
*Attorney, Agent, or Firm*—Wenderoth, Lind & Ponack

[57] ABSTRACT

An aqueous suspension consisting basically of pharmaceutically active ingredient(s) which is insoluble or sparingly soluble in water and a suspending agent consisting of (1) crystalline cellulose, (2) at least one component selected from the group consisting of cellulose ether, polyvinyl alcohol and copolymer of polyvinyl alcohol with polyvinyl pyrrolidone, and (3) at least one component selected from the group consisting of polyvinyl pyrrolidone, vegetable mucilage and derived protein, in which said active ingredient(s) can satisfactorily be suspended for administration.

15 Claims, No Drawings

AQUEOUS SUSPENSION OF PHARMACEUTICALS

This invention relates to novel and useful aqueous suspension type pharmaceuticals and a method of preparing the aqueous suspension.

As a typical suspending agent for preparing aqueous suspension type pharmaceuticals, there has been known crystalline cellulose.

Among pharmaceutically active ingredients to be prepared into an aqueous suspension, there are many ones which can not satisfactorily be suspended with crystalline cellulose.

In this connection, the present inventors have made an extensive study and found that a pharmaceutically active ingredient(s), which has not so far been satisfactorily suspended in water with the aid of crystalline cellulose, can satisfactorily be suspended with a suspending agent consisting of (1) crystalline cellulose, (2) at least one component selected from the group consisting of cellulose ether, polyvinyl alcohol and copolymer of polyvinyl alcohol with polyvinyl pyrrolidone, and (3) at least one component selected from the group consisting of polyvinyl pyrrolidone, vegetable mucilage and derived protein.

The present invention was completed on the basis of the above finding.

Principal object of the present invention is to provide an aqueous suspension of a pharmaceutically active ingredient(s) which is insoluble or sparingly soluble in water, containing the particular suspending agent consisting of the above-mentioned three components (1), (2) and (3).

Another object of the present invention is to provide a process for preparing the aqueous suspension.

Further objects will be made clear from the present specification.

The aqueous suspension of the present invention consists basically of a pharmaceutically active ingredient(s) and the suspending agent consisting of the said three components (1), (2) and (3).

The present aqueous suspension is prepared by mixing the respective components constituting the present aqueous suspension in any sequence.

As the crystalline cellulose to be preferably employable in the present suspension, there may be mentioned such one as having an average particle size of about 0.5 $\mu$ to about 130 $\mu$.

As the cellulose ether to be employable as the component (2) of the present suspending agent, there may be exemplified by methyl cellulose, ethyl cellulose, carboxymethyl cellulose, alkali metal salt of carboxymethyl cellulose or hydroxyethyl cellulose.

As the polyvinyl alcohol to be preferably employable as the component (2) of the suspending agent, there may be mentioned such one as having a molecular weight of about 8,000 to about 180,000.

As the copolymer of polyvinyl alcohol with polyvinyl pyrrolidone, there may be mentioned such one as having a molecular weight of about 20,000 to about 180,000, preferably about 20,000 to about 100,000.

As the polyvinyl pyrrolidone to be employable as the component (3) of the suspending agent, there may be mentioned such one as having a molecular wieght of about 10,000 to about 300,000, preferably about 10,000 to about 100,000.

The vegetable mucilage is a general name given for polysaccharide found in plants, and it gives a sticky solution when dissolved in water. As the vegetable mucilage to be employable as the component (3) of the suspending agent, there may be exemplified by seaweed mucilage (e.g., propylene glycol alginate, alginic acid, alkali metal salt of alginic acid, agar or carragheenin), plant gum (e.g., tragacanth gum, acacia gum, karaya gum or cherry gum) or pectic substance (e.g., pectin, pectic acid or alkali metal salt of pectic acid).

The derived protein is a general name given for protein derived from natural protein after being subjected to chemical, biological or physical treatment (e.g., chemical or enzymic reaction or heat treatment).

As the derived protein to be employable as the component (3) of the suspending agent, there may be exemplified by gelatin (e.g., gelatin type A or gelatin type B), gelatin modified with succinic acid or denaturated collagen.

A proportion of crystalline cellulose, the component (1) is generally about 0.3 to about 5 weight/volume percent and, preferably, about 0.5 to about 2.5 weight/volume percent based on the entire quantity of the aqueous suspension contemplated.

The component (2) and the component (3) are used in a combined proportion of, ordinarily, about 0.1 to about 4 weight/volume percent and, preferably, about 0.2 to about 2.5 weight/volume percent, relative to the entire quantity of the suspension contemplated.

A weight ratio of the component (2) relative to the component (3) ranges from about 15/85 to 80/20.

The pharmaceutically active ingredient(s) to be suspended in accordance with the present invention may be any one which is insoluble or sparingly soluble in water, irrespective whether it may be used for human beings or for other animals. Those may be exemplified by bucetin (i.e., 4-ethoxy-3-hydroxybutyranilide), acetylsalicylic acid, estradiol, phenacetin, dibenzoylthiamine, prednisolone, sulfaguanidine, santonin, albumin tannate, cloperastine [i.e. 1-[2-(4-chloro-α-phenylbenzyloxy)ethyl]piperidine]-hydroxyphenylbenzoylbenzoate, diazepam, noscapine, bismuth subnitrate, sulfisomidine, chloramphenicol palmitate or N-phenyl-N-(pyridylmethyl)-2-(N-piperidyl)ethylamine tripalmitate.

Such active ingredient(s) as exemplified above can satisfactorily be suspended in accordance with the present invention and a proportion of the active ingredient(s) up to about 8 percent by weight per volume of the entire quantity of the suspension contemplated generally gives a good result. Further, it is preferable in general that the active ingredient(s) to be suspended has an average particle size smaller than about 100 $\mu$.

If desired, the present suspension may be incorporated with water-soluble substances without undesirable effect. Such water-soluble substances may be non-electrolyte (e.g., sucrose, sorbitol or glycerol) or electrolyte (e.g., methylephedrine hydrochloride, chlorpheniramine maleate, sulpyrin, aminopyrine, caffeine, noscapine hydrochloride, dihydrocodeine phosphate, kainic acid, ascorbic acid, sodium ascorbate, potassium guaicolsulfonate, ferrous sulfate, ammonium chloride, pyridoxine hydrochloride, nicotinamide, benzoic acid, sodium benzoate, dehydroacetic acid, sodium dehydroacetic acid, sorbic acid, potassium sorbate, paraoxybenzoic acid esters, salicylic acid or sodium salicylate).

The water-soluble non-electrolyte may be added in an amount of up to its solubility in aqueous portion of the present suspension.

The water-soluble electrolyte may be added generally in an amount of up to 20 percent by weight per volume of the present suspension.

The present suspension may further be incorporated with flavor, food color, preservative or surfactant.

The present aqueous suspension has advantages as exemplified below:

a. An active ingredient(s) can homogeneously be suspended, b. A state of homogeneous suspension is kept for a period long enough to take the suspension for administration, c. A state of homogeneous suspension can be repeatedly produced, and d. The suspending agent consisting of the components (1), (2) and (3) is quite harmless.

These advantages are obtained by the use of the particular suspending agent consisting of the three components and are not attained when at least any one of the three components (1), (2) and (3) lacks.

EXAMPLE 1

In an adequate volume of water, there are dissolved 0.2 g. of caffeine and 0.2 g. of sodium benzoate as water-soluble ingredients. To this aqueous solution there are dissolved with stirring a combined total of 0.3 g. of methyl cellulose [the component (2) of the suspending agent] and propylene glycol alginate [the component (3) of the suspending agent] in the varied proportions indicated in Table 1, together with 10.0 g. of refined sucrose. Then, an aqueous dispersion of 0.3 g. of cloperastine hydroxyphenylbenzoylbenzoate, which is a water-insoluble ingredient and has an average particle size of about 20 $\mu$, in an adequate volume of water containing 1.0 g. of crystalline cellulose [the component (1) of the suspending agent] and 0.05 g. of polyoxyethylene (20) sorbitan monooleate, is added to each of the above solutions and dispersed therein under stirring.

Then, the sufficient volume of water is added under stirring with magnetic stirrer for 30 minutes to make a total of 100.0 ml. each. Each of the suspensions thus obtained are transferred to storage bottles and examined for their states of suspensions after 1 week storage. The results are set forth in Table 1.

Table 1

| Weight ratio of the component (2) to the component (3) | | Result of a visual examination | |
|---|---|---|---|
| Component(2) Methyl cellulose | Component(3) Propylene glycol alginate | Height of suspending phase (mm) | The appearance of suspending phase |
| 0 | 0 | 23 | Unhomogeneous, with large flocculate |
| 0 | 1.00 | 30 | Unhomogeneous, with large flocculate |
| 0.20 | 0.80 | 46 | Homogeneous |
| 0.40 | 0.60 | 51 | homogeneous |
| 0.60 | 0.40 | 58 | Homogeneous |
| 0.80 | 0.20 | 42 | Homogeneous |
| 1.00 | 0 | 32 | Homogeneous |

Remarks: The height of the aqueous suspension: 58 mm.

As will be seen from Table 1, the mere use of crystalline cellulose alone or of either one of the component (2) or the component (3) in combination with crystalline cellulose does not lead to satisfactory results.

EXAMPLE 2

In an adequate amount of water is dispersed 1.8 g. of crystalline cellulose (average particle size: about 7 $\mu$.). In the dispersion there is added with stirring a solution of 60 g. of sorbitol, 0.03 g. of kainic acid and 0.15 g. of sodium benzoate in an adequate volume of water.

Then, an aqueous dispersion of 13.3 g. of piperazine adipate and 0.2 g. of santonin (water-insoluble ingredient whose average particle size is about 70 $\mu$) containing 0.3 g. of polyvinyl alcohol [the component (2), mol. wt. 66,000, approx.] and 1.2 g. of polyvinyl pyrrolidone [the component (3), mol. wt. 30,000, approx.] is added and dispersed under stirring, followed by the addition of food color of yellow (tartrazine) and orange flavor. The mixture is stirred and made up to 120 ml. with water.

EXAMPLE 3

In an adequate amount of water are dissolved 100 mg. of methyl p-hydroxybenzoate, 30 mg. of propyl p-hydroxybenzoate, 28 mg. of methylephedrine hydrochloride, 140 mg. of potassium guaiacol sulfonate, 130 mg. of caffeine, 7 mg. of chlorphenylamine maleate, 80 mg. of citric acid and 520 mg. of sodium citrate. In the resultant aqueous solution is further dissolved a mixture of 50 g. of granulated sugar, 200 mg. of propylene glycol alginate [the component (3)] and 300 mg. of methyl cellulose [the component (2)]. Then, 1,000 mg. of crystalline cellulose (average particle size: about 15 $\mu$) is added and dispersed. To this dispersion is added a dispersion of 1,000 mg. of bucetin (water-insoluble ingredient) containing 100 mg. of polyoxyethylene (20) sorbitan monooleate, followed by mixing. Then, with the addition of a color and a flavor of the same kind as in Example 1, the mixture is stirred and diluted to 100 ml. with water.

EXAMPLE 4

In an aqueous solution of 0.15 g. of methyl p-hydroxybenzoate dissolved in an adequate volume of water, there are dissolved 0.25 g. of sodium carboxymethyl cellulose and 0.55 g. of gelatin type B. To the solution is dispersed 2.0 g. of crystalline cellulose (average particle size: about 20 $\mu$).

To the dispersion is added a dispersion of 0.2 g. of cloperastine hydroxyphenylbenzoylbenzoate (water-insoluble ingredient whose average particle size is about 20 $\mu$) scattered in water containing 0.05 g. of polyoxyethylene (50) hydrogenated castor oil. Then, an aqueous solution containing 0.15 g. of sodium dehydroacetate, 0.2 g. of noscapine hydrochloride, 0.1 g. of saccharin sodium and 10.0 g. of sorbitol and 0.5 g. of glycerin are added, followed by stirring. Finally, the mixture is made up to 100 ml. with water.

EXAMPLE 5

In a solution of 0.02 g. of ethyl p-hydroxybenzoate dissolved in an adequate volume of water, there are dissolved 0.5 g. of sodium pectinate [the component (3)], 0.6 g. of sodium carboxymethyl cellulose [the component (2)], 5 g. of granulated sugar and 40 g. of sorbitol. To the solution there is added and suspended an aqueous dispersion of 5 g. of crystalline cellulose [the component (1) whose average particle size is about 75 $\mu$], 0.4 g. of polyoxyethylene (20) sorbitan monooleate and 4 g. of N-phenyl-N-(pyridylmethyl)-2-(N-piperidyl)ethylamine tripalmitate (water-insoluble ingredient whose average particle size is about 30 μ). The suspension thus obtained is made up to 100 ml. with water.

EXAMPLE 6

In a solution of 280 mg. of polyoxyethylene (20) sorbitan monooleate, there is dispersed 3 g. of chloramphenicol palmitate (water-insoluble ingredient whose average particle size is about 3 μ).

In an adequate volume of water, there are dissolved 300 mg. of tragacanth gum [the component (3)], 500 mg. of sodium carboxymethyl cellulose and 40 g. of granulated sugar. In the solution 4 g. of crystalline cellulose [the component (1) whose average particle size is 40 μ] is dispersed.

The dispersions prepared above are combined and mixed and made up to 100 ml. with water.

What we claim:

1. In an aqueous suspension containing up to 8 percent by weight per volume of a pharmaceutically active ingredient(s) which is insoluble or sparingly soluble in water having an average size particle size smaller than about 100 μ and a suspending agent, the improvement, wherein the suspending agent consists essentially of
    1. Crystalline cellulose
    2. at least one component selected from the group consisting of methyl cellulose, sodium carboxymethyl cellulose and polyvinyl alcohol having a molecular weight of 8,000 to 180,000; and
    3. at least one component selected from the group consisting of polyvinyl pyrrolidone having a molecular weight of 10,000 to 3000,000, propylene glycol alginate, sodium pectinate, tragacanth gum and gelatin, the amount of component (1) being 0.3 to 5 weight/volume percent of the aqueous suspension, the amount of component (2) plus the component (3) being 0.1 to 4 weight/volume percent of the aqueous suspension and wherein the weight ratio of component (2) relative to component (3) being in the range of from 15/85 to 80/20.

2. The aqueous suspension as claimed in claim 1, wherein methyl cellulose is employed as component (2).

3. The aqueous suspension as claimed in claim 1, wherein polyvinyl alcohol is employed as component (2).

4. The aqueous suspension as claimed in claim 1, wherein sodium carboxymethyl cellulose is employed as component (2).

5. The aqueous suspension as claimed in claim 1, wherein propylene glycol alginate is employed as component (3).

6. The aqueous suspension as claimed in claim 1, wherein polyvinyl pyrrolidone is employed as component (3).

7. The aqueous suspension as claimed in claim 1, wherein gelatin is employed as component (3).

8. The aqueous suspension as claimed in claim 1, wherein sodium pectinate is employed as component (3).

9. The aqueous suspension as claimed in claim 1, wherein tragacanth gum is employed as component (3).

10. The aqueous suspension as claimed in claim 1, wherein the amount of component (1) is 0.5 to 2.5 weight/volume percent of the aqueous suspension and the amount of the component (2) plus the component (3) is 0.2 to 2.5 weight/volume percent of the aqueous suspension.

11. The aqueous suspension as claimed in claim 1, wherein methyl cellulose is employed as component (2) and propylene glycol alginate is employed as component (3).

12. The aqueous suspension as claimed in claim 1, wherein polyvinyl alcohol is employed as component (2) and polyvinyl pyrrolidone is employed as component (3).

13. The aqueous suspension as claimed in claim 1, wherein carboxymethyl cellulose is employed as component (2) and gelatin is employed as the component (3).

14. The aqueous suspension as claimed in claim 1, wherein sodium carboxymethyl cellulose is employed as component (2) and sodium pectinate is employed as component (3).

15. The aqueous suspension as claimed in claim 1, wherein sodium carboxymethyl cellulose is employed as component (2) and tragacanth gum is employed as component (3).

* * * * *